Patented Sept. 22, 1942

2,296,716

UNITED STATES PATENT OFFICE 2,296,716

COLLOIDAL PHOSPHATE

Fredrick C. Jelen, Anniston, Ala., assignor to Monsanto Chemical Company, a corporation of Delaware No Drawing. Application November 28, 1940,
Serial No. 367,574

6 Claims. (Cl. 23—106)

This invention provides a new colloidal and plastic phosphate of the composition: $K_1Na_5(PO_3)_6$.

Related to the above new phosphate is the plastic phosphate previously made by Tammann and described by him in Journ. fur Prakt. Chemie 45, 417, 1892. The composition of the Tammann phosphate is given as: $K_2Na_4(PO_3)_6$ and was named dipotassium tetrasodium hexametaphosphate.

The Tammann phosphate may be prepared by treating the insoluble salt, $K_2Ag_4(PO_3)_6$ with a sodium chloride solution or by treating $K_2Sr_2(PO_3)_6$ with sodium sulphate solution. It may also be made by treating the difficultly soluble potassium metaphosphate with sodium chloride solution.

My product may be made by the Tammann method involving the reaction of $KPO_3$ with NaCl solution, provided that a large excess of NaCl is employed. The excess required is of the order of 4 to 5 times that required by the reaction:

$$6KPO_3 + 5NaCl = K_1Na_5(PO_3)_6 + 5KCl$$

An example of the preparation of my new phosphate is as follows:

Dissolve 1000 grams of NaCl (theory 211 grams) in 5000 grams of water and a thin slurry of 500 grams of $KPO_3$ (preferably sintered) in 3000 grams of water is added to the NaCl solution. The mixed solution is stirred in an efficient mixing device since the $KPO_3$ otherwise becomes coated with the reaction product. The process is carried out at room temperature.

The reaction product obtained is a stiff dough-like mass. The product contains the excess NaCl not utilized in the reaction and also contains the KCl formed by the reaction. The NaCl and KCl retained may be removed from the plastic mass by washing the mass with successive quantities of water while in the mixer. The last amount of chloride is removed by dissolving in water and precipitating with an organic reagent such as alcohol.

The product as thus prepared is a stiff dough-like mass containing in the neighborhood of 40% of liquid.

It may be dissolved in water to produce a viscous colloidal solution containing varying percentages of solids up to 30 or 40%.

While the water solutions of the previously known compound: $KNa_4(PO_3)_6$ are in 1% solution at 30° C. approximately 11 times as viscous as pure water, the water solutions of my newly discovered salt $K_1Na_5(PO_3)_6$ at 1% concentration are approximately 100 to 200 times as viscous as pure water.

For example, while the viscosity of a 1% solution at 30° C. of the salt $K_2Na_4(PO_3)_6$, when freshly made, is of the order of .08 to .09 poise, the viscosity of a 1% solution of the salt $K_1Na_4(PO_3)_6$ at 30° C. is when freshly prepared of the order of 0.8 to 1.7 poises. The viscosity of pure water is 0.008 poise. Thus the newly discovered salt has a viscosity of from 100 to 200 times that of water.

By virtue of the higher viscosity my salt has valuable dispersing and suspending properties. It may for example be employed as a suspending and peptizing agent in the manufacture of suspensions and emulsions of solids or liquids. It may also be used as a textile sizing agent.

My salt possesses its maximum viscosity when freshly prepared. It, however, suffers some degradation, showing, just as does the Tammann salt, a falling off of viscosity with age of the solution. Accordingly for the purpose of obtaining the maximum viscosity the solutions should be freshly prepared.

Cast films can be prepared of my new salt which are stronger and tougher than films of the Tammann salt. When dried in air such film contain in the neighborhood of 10–15% water and are flexible, transparent, elastic and tough.

What I claim is:
1. The new compound, $K_1Na_5(PO_3)_6$.
2. Colloidal solutions comprising the salt $K_1Na_5(PO_3)_6$.
3. Colloidal solutions of the salt: $K_1Na_5(PO_3)_6$.
4. Colloidal aqueous solutions of $K_1Na_5(PO_3)_6$ having in 1% solutions when freshly prepared, a viscosity at 30° C. of from 0.8 to 1.7 poises.
5. A cast film comprising essentially the compound, $K_1Na_5(PO_3)_6$, said film being flexible and transparent.
6. An air dried film comprising the compound, $K_1Na_5(PO_3)_6$, said film containing in the neighborhood of 10–15% water and being flexible and transparent.

FREDRICK C. JELEN.